US009418232B1

(12) United States Patent
Khetawat et al.

(10) Patent No.: US 9,418,232 B1
(45) Date of Patent: Aug. 16, 2016

(54) PROVIDING DATA LOSS PREVENTION FOR COPYING DATA TO UNAUTHORIZED MEDIA

(71) Applicant: Symantec Corporation, Mountain View, CA (US)

(72) Inventors: Rupesh Hanumant Khetawat, Pune (IN); Vishal Prafulla Shetye, Pune (IN)

(73) Assignee: Symantec Corporation, Mountain View, CA (US)

( * ) Notice: Subject to any disclaimer, the term of this patent is extended or adjusted under 35 U.S.C. 154(b) by 36 days.

(21) Appl. No.: 14/337,955

(22) Filed: Jul. 22, 2014

(51) Int. Cl.
  *G06F 21/62* (2013.01)
  *G06F 21/60* (2013.01)
  *G06F 21/88* (2013.01)

(52) U.S. Cl.
  CPC .................................... *G06F 21/60* (2013.01)

(58) Field of Classification Search
  CPC .. G06F 21/60; G06F 21/6245; G06F 21/6263
  See application file for complete search history.

(56) References Cited

U.S. PATENT DOCUMENTS

| | | | | |
|---|---|---|---|---|
| 7,991,747 B1 * | 8/2011 | Upadhyay | ............. | G06F 11/004 707/674 |
| 8,219,766 B1 * | 7/2012 | Orcutt | ................. | G06F 21/6245 707/640 |
| 8,234,496 B1 * | 7/2012 | Ding | ........................ | G06F 21/16 713/161 |
| 8,565,108 B1 * | 10/2013 | Marshall | ................. | G06F 21/60 370/252 |
| 2012/0131012 A1 * | 5/2012 | Taylor | ..................... | G06Q 10/00 707/748 |
| 2014/0007246 A1 * | 1/2014 | Nelson | ..................... | H04L 63/12 726/26 |
| 2014/0026182 A1 * | 1/2014 | Pearl | ........................ | G06F 21/60 726/1 |
| 2014/0137273 A1 * | 5/2014 | Workman | ........... | G06F 21/6218 726/32 |
| 2014/0359085 A1 * | 12/2014 | Chen | ................... | H04L 41/0803 709/220 |

OTHER PUBLICATIONS

Pratical Data-Leak Prevention for Legacy Applications in Enterprise Networks. Mundada et al. 2011.*
Design of Internal Information Leakage Detection System Considering the Privacy Violation. Kim.IEEE(2010).*
System Call Interception Framework for Data Leak Prevention. Balinsky et al. IEEE(2011).*
Data Loss Prevention based on data-driven Usage Control. Wuchner et al. IEEE(2012).*

* cited by examiner

*Primary Examiner* — Venkat Perungavoor
(74) *Attorney, Agent, or Firm* — Wilmer Cutler Pickering Hale and Dorr LLP (57) ABSTRACT

A processing device detects a file system call that is associated with copying data to a destination file. The processing device identifies an application initiating the copying of the data to the destination file and determines one or more files that are opened by the application. The processing device identifies a source file from the one or more files opened by the application. The source file corresponds to the destination file. The processing device determines whether the source file includes data to be protected and allows or denies the copying of the data to the destination file based on whether the source file includes data to be protected.

20 Claims, 4 Drawing Sheets

PROVIDING DATA LOSS PREVENTION FOR COPYING DATA TO UNAUTHORIZED MEDIA

TECHNICAL FIELD

The present disclosure relates to copying data, and more particularly, to providing Data Loss Prevention ("DLP") for copying data to unauthorized media.

BACKGROUND

An Enterprise, such as, a business organization, can store data that may have sensitive content. Such sensitive data can come in the form of private or company information, intellectual property (IP), financial or patient information, credit-card data, and other information depending on the business and the industry. Data loss prevention (DLP) solutions generally detect sensitive data in documents and prevent unauthorized access, saving and/or sharing of the sensitive data. Traditional DLP solutions typically prevent unauthorized access, saving and/or sharing of the sensitive data by monitoring, detecting and blocking sensitive data while in-use (endpoint actions), in-motion (network traffic), and at-rest (data storage). Users may attempt to copy the sensitive data to an unauthorized location, such as removable media. The sensitive data may be stored in digital files. For example, a user may attempt to copy a file containing confidential employee information from a work system to a removable Universal Serial Bus ("USB") storage device (e.g., USB flash drive). Protection from copying sensitive data to unauthorized media is extremely important, as the copies of the sensitive data may subsequently be easily distributed. Existing DLP solutions are inefficient, difficult to implement, and/or have security holes in which the sensitive data may be lost. For example, existing solutions typically allow a file to be first copied from a local storage to the removable media (e.g., USB flash drive) before the file is scanned for sensitive data. Once the file copy operation is complete, the copied file on the removable media is scanned for sensitive data. The copied file is subsequently deleted if the copied file contains sensitive data. Conventional solutions generally have security flaws in that a user may eject the removable media after the file has been copied, but before the scan for sensitive data occurs, thereby bypassing the deleting of the sensitive file from the removable media. Additionally, conventional solutions are generally inefficient because the scan for sensitive data is performed on the removable media after the file is copied to the removable media, and in some cases, the scanning of the removable media can be 3-4 times slower than scanning the local storage. Other traditional solutions involve modifying specific applications to perform a scan for sensitive data prior to the file copy. However, such traditional solutions are application specific, which generally require modification of the various available applications to ensure security. Such traditional solutions are complex and can be difficult to maintain. Additionally, such conventional solutions are not very stable and may cause an application to fail.

SUMMARY

In one implementation, a system and method for providing data loss prevention (DLP) for copying data to unauthorized media is described. An exemplary system can include a memory and a processing device that is coupled to the memory. In one implementation, the system detects a file system call. The file system call is associated with copying data to a destination file. The system identifies an application initiating the copying of the data to the destination file, determines one or more files that are opened by the application, and identifies a source file from the one or more files opened by the application. The source file corresponds to the destination file. The system determines whether the source file includes data to be protected, and allows or denies the copying of the data to the destination file based on whether the source file includes data to be protected.

In one implementation, the file system call is one of a file create system call or a file write system call. In one implementation, the destination file resides on at least one of a removable media, a network location, a local media, or a temporary media. In one implementation, the system identifies the source file by determining if a destination file name for the destination file matches a file name of one of the one or more files that are opened by the application. In one implementation, the system identifies the source file by correlating metadata for the one or more files opened by the application with metadata for the destination file. In one implementation, the metadata for the one or more files opened by the application and the metadata for the destination file comprises at least one of a file name, a last accessed time, a file creation time, a file type, or a file size. In one implementation, the system determines the one or more files opened by the application by accessing a list of one or more open files in a file descriptor table for the application. In one implementation, the system identifies the source file from the one or more files opened by the application by detecting a subsequent file system call that is associated with the copying of the data to the destination file.

In addition, a non-transitory computer readable storage medium for providing DLP for copying data to unauthorized media is described. An exemplary computer readable storage medium provides instructions, which when executed by a processing device causes the processing device to detect a file system call. The file system call is associated with copying data to a destination file. The instructions that will cause the processing device to identify an application initiating the copying of the data to the destination file, determine one or more files that are opened by the application, and identify a source file from the one or more files opened by the application. The source file corresponds to the destination file. The instructions that will cause the processing device to determine whether the source file includes data to be protected and allows or deny the copying of the data to the destination file based on whether the source file includes data to be protected.

Further, a method for providing DLP for copying data to unauthorized media is described. In one embodiment, the method comprises detecting, by a processing device, a file system call. The file system call is associated with copying data to a destination file. The method further comprises identifying an application initiating the copying of the data to the destination file, determining one or more files that are opened by the application, and identifying a source file from the one or more files opened by the application. The source file corresponds to the destination file. The method further comprises determining whether the source file includes data to be protected and allowing or denying the copying of the data to the destination file based on whether the source file includes data to be protected.

BRIEF DESCRIPTION OF THE DRAWINGS

The present disclosure will be understood more fully from the detailed description given below and from the accompanying drawings of various implementations of the disclosure.

DETAILED DESCRIPTION

The present disclosure is directed to providing data loss prevention (DLP) for copying data to unauthorized media, according to various implementations. DLP generally detects sensitive data in documents and prevents unauthorized access, saving and/or sharing of the sensitive data. Implementations of the present disclosure provide data loss prevention when copying sensitive data to unauthorized media in an efficient manner. Sensitive data hereinafter refers to data that is to be protected. Examples of sensitive data can include, and are not limited to, private or company information, intellectual property (IP), financial or patient information, credit-card data, and other information depending on the business and the industry. Sensitive data can be stored in digital files (hereinafter referred to as "file" or "files"). Implementations of the present disclosure provide the additional benefit of determining whether a file contains sensitive data prior to the file being copied to the media, saving valuable processing resources and time.

For example, a user may use an application, such as Windows® Explorer, to copy one or more files from a local hard drive to a removable media (e.g., USB flash drive). Implementations of the present disclosure can determine whether the file or files on the local hard drive contain sensitive data and decide whether the copy operation should be allowed or denied before the file or files are copied to the removable media. A copy operation can include, and is not limited to, a file copy and a file move operation (hereinafter referred to as "copy operation"). Implementations of the present disclosure can detect a copy operation for copying data to a destination. The destination can be, for example, and is not limited to, a USB flash drive, a Network Attached Storage ("NAS"), or an external hard drive. Data that is to be copied is hereinafter referred to as "source data". A file that contains the data to be copied is hereinafter referred to as a "source file". A file that contains a copy of the source data is hereinafter referred to as a "destination file". Implementations of the present disclosure can identify which source file corresponds to the copy operation and can determine whether the source file contains data to be protected. Implementations of the present disclosure can either permit or block the copy operation based on whether the source file contains data to be protected.

Unlike conventional solutions, which modify applications to identify a source file that corresponds to a copy operation, implementations of the present disclosure can use metadata for the possible source files and metadata for the destination file to determine which of the possible files is the source file that corresponds to the copy operation. Metadata is described in greater detail below in conjunction with FIG. 1. Implementations of the present disclosure provide an advantage over conventional solutions in that no modification of applications is required, which provides a generic solution that can work across all applications.

Figure 1:
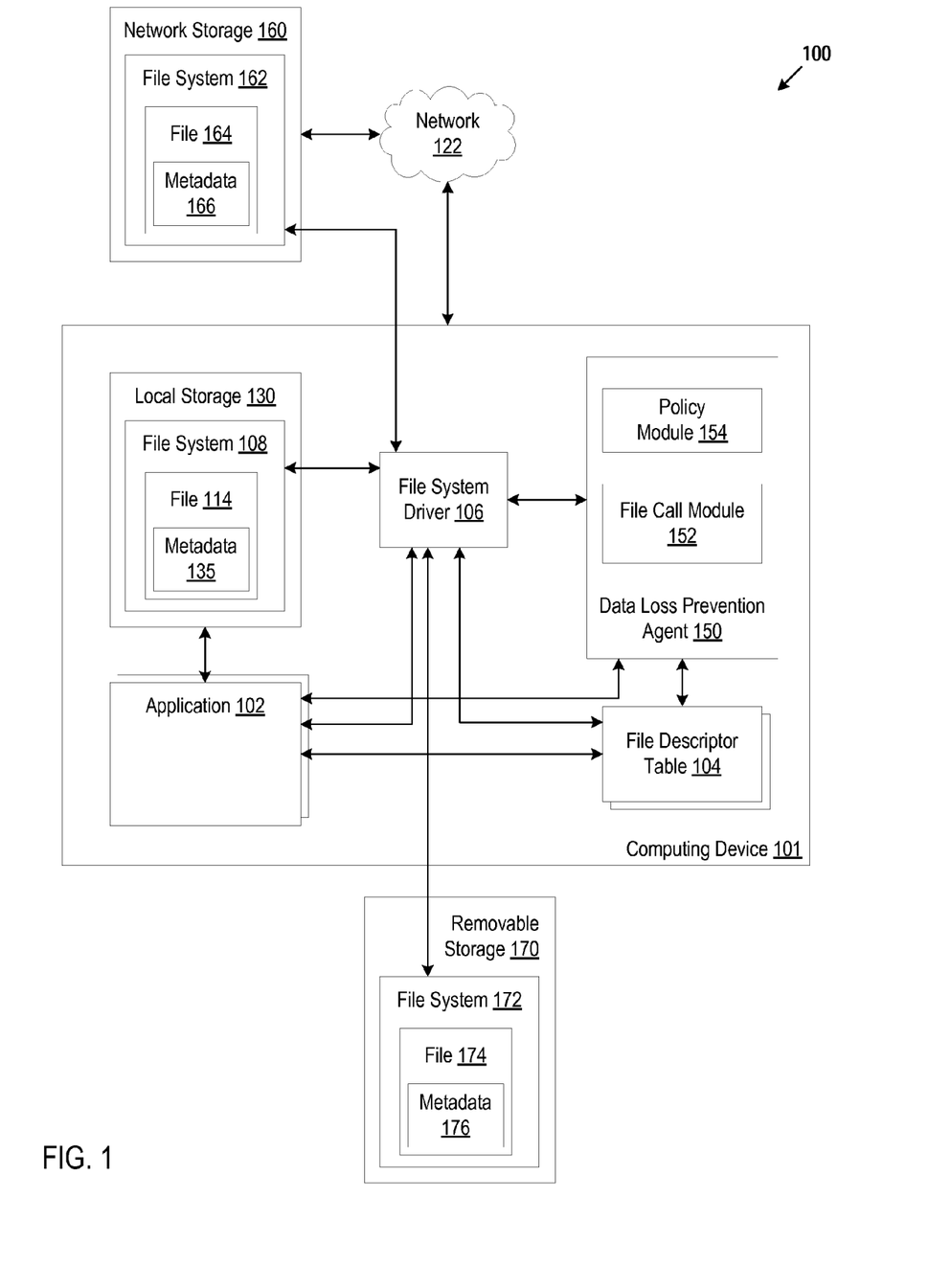
FIG. 1 illustrates example system architecture, in accordance with various implementations.

FIG. 1 is a block diagram of an exemplary system architecture 100 in which implementations of the present disclosure can be implemented. The system architecture 100 can include a computing device 101 and a network storage 160 which can connect to a network 122 (e.g., public network such as the Internet or private network such as a local area network (LAN)). The computing device 101 can include personal computers, laptops, netbooks, personal digital assistants (PDAs), mobile phones, tablets computers, network appliances, etc.

The network storage 160 can include network attached storage (NAS), another computing device with a network share, online storage services, or similar. The computing device 101 and the network storage 160, can reside on the same LAN, or on different LANs that may be coupled together via the Internet, but separated by firewalls, routers, and/or other network devices.

The computing device 101 can include one or more files 114 stored in a local storage 130. Files 114 can include, and are not limited to, documents, images, videos, spreadsheets, audio files, compressed files, or similar. Files 114 can include sensitive data (e.g. credit card information, social security numbers, bank account numbers, etc.). The local storage 130 can be, and is not limited to, mass storage devices, such as magnetic or optical storage based disks, solid-state drives (SSDs) or hard drives. The local storage 130 can be persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The computing device 101 can be coupled to removable storage 170. A removable storage 170 can connect to the computing device 101 through various methods, such as USB, External Serial Advanced Technology Attachment ("eSATA"), thunderbolt, or other. Examples of the removable storage 170 can include, and are not limited to, a flash drive, hard drive, solid state drive, mass storage device, CD-ROM, DVD-ROM, Blu-Ray disc, zip drive, floppy disk, or other.

Files 114 can be copied to and from the local storage 130 to removable storage 170 or network storage 160, or any combination thereof. The computing device 101 can include an application 102 to copy or move a file (e.g., file 114, file 164, file 174) to a destination. The destination can be, for example, and not limited to, removable media, network storage, local media, temporary media, or other location. For example, if the file is file 114, the destination can be removable storage 170 or network storage 160. In another example, if the file is file 174, the destination can be local storage 130 or network storage 160. In another example, if the file is file 164, the destination can be local storage 130 or removable storage 170. For example, a user may copy files 114 from an internal hard drive (local storage 130) to an external hard drive connected via eSATA (removable storage 130). A user may also copy files 114 from a SSD drive (local storage 130) to a NAS (network storage 160).

The application 102 can be any application that can perform an operation to copy a file and/or create a file. Examples of an application 102 can include for example, and are not limited to, Windows® Explorer, Finder®, Terminal, Command Prompt, or applications such as Microsoft® Office.

A storage device (e.g., local storage 130, network storage 160, removable storage 170) can include a file system (e.g., file system 108, file system 162, file system 172). A file system 108,162,172 (or filesystem) can control how data (e.g., file(s) 114, file(s) 164, file(s) 174) is stored and retrieved. Examples of file systems 108,162,172 can include, and are not limited to, File Allocation Table (FAT) systems, New Technology File System (NTFS), ext2, ext3, ext4, Network File System (NFS), Server Message Block (SMB), or ISO 9660.

The computing device 101 can include one or more file system drivers 106 that can interpret the structures of the corresponding file system(s) 108,162,172 and present a logical hierarchical view to the applications (e.g., application 102) using the particular file system. The file system driver 106 can be part of the operating system, or can be a third party module installed on the operating system.

An application 102 can access files, for example, to copy data, using one or more file system calls. For example, application 102 can request access to the file system 108 for access to file 114 via the file system driver 106 of the operating system. The file system call can include, and not limited to, a file create call, a file delete call, a file open call, a file close call, a file read call, or a file write call.

A user may attempt to copy a file 114, which contains sensitive credit card data and has a filename creditcard.xls, from the local storage 130 to the removable storage 170 (e.g. USB flash drive). A copy operation can utilize multiple file system calls. For example, the application 102 can send a file open system call to the file system driver 106 to open a file 114 (e.g., creditcard.xls) on the local storage 130. The file system driver 106 can communicate with the appropriate file system (e.g., file system 108) to open the file 114. The application 102 can then send a file create system call to the file system driver 106 to request the creation of a destination file (e.g., file 174) on the removable storage 170 (e.g., USB flash drive). The file system driver 106 can communicate with the appropriate file system (e.g., file system 172) to create the destination file (e.g., file 174). In one example, the destination file has the same file name as the source file. In another example, a user may give the destination file a file name that is different than the source file.

The application 102 can then send a file read system call to the file system driver 106 to read the data from the file 114 (e.g., creditcard.xls). The file system driver 106 can request the data from the appropriate file system (e.g., file system 108). The application 102 can then send a file write system call to the file system driver 106, and the file system driver 106 can communicate with the appropriate file system (e.g., file system 172) to write the data from creditcard.xls to the destination file (e.g., file 174).

The application 102 can then send a file close system call to the file system driver 106 to close the file 114 (e.g., creditcard.xls), and the file system driver 106 can communicate with the appropriate file system (e.g., file system 108) to close the file 114. The application 102 can send a file close system call to the file system driver 106 to close the destination file (e.g., file 174), and the file system driver 106 can communicate with the appropriate file system (e.g., file system 172) to close the file 174.

The data loss prevention agent 150 can protect loss of data (e.g., files 114, files 164, files 174). The data loss prevention agent 150 can include a policy module 154 that defines data policies for protecting source data. For example, there may be a policy prohibiting the copying of sensitive data to removable media 170 and/or network storage 160. The data loss prevention agent 150 can include a file call module 152 to monitor, detect, and intercept the file system calls made to the file system driver to detect copy or move operations. The file call module 152 can monitor the file system driver 106 for any file system calls sent by an application 102 and pertaining to a copy operation.

The application 102 can have multiple files 114 open. Each application 102 can be associated with a file descriptor table 104 that indicates which files are open by the corresponding application 102. The file call module 152 can read the file descriptor table 104 to determine which files 114 are open by the application 102. The file call module 152 can use the metadata 116 for each file 114 that is opened and the metadata for the destination file to determine which of the opened files is the source file that corresponds to the copy operation. For example, the destination file can be a file 174 created on the removable storage 170, or a file 164 created on the network storage 160.

Metadata (e.g., metadata 135,166,176) is information that is associated with a corresponding file (e.g., file 114,164, 174). Metadata 135,166,176 can be, for example, and is not limited to, a last modified time, a timestamp, a file creation time, a last accessed time, a file type, a file's access permissions, a file name, a file size, a file location.

Once the source file is identified, the policy module 154 and/or the file call module 152 can determine whether the source file contains sensitive data and can cause an action to be taken based on whether the source file contains sensitive data. For example, the file call module 152 can intercept a file write system call being sent from an application 102 to the file system driver 106, and can prevent the file system driver 106 from communicating with the appropriate file system (e.g., file system 172) to write the data from creditcard.xls to the destination file (e.g., file 174).

Figure 2:
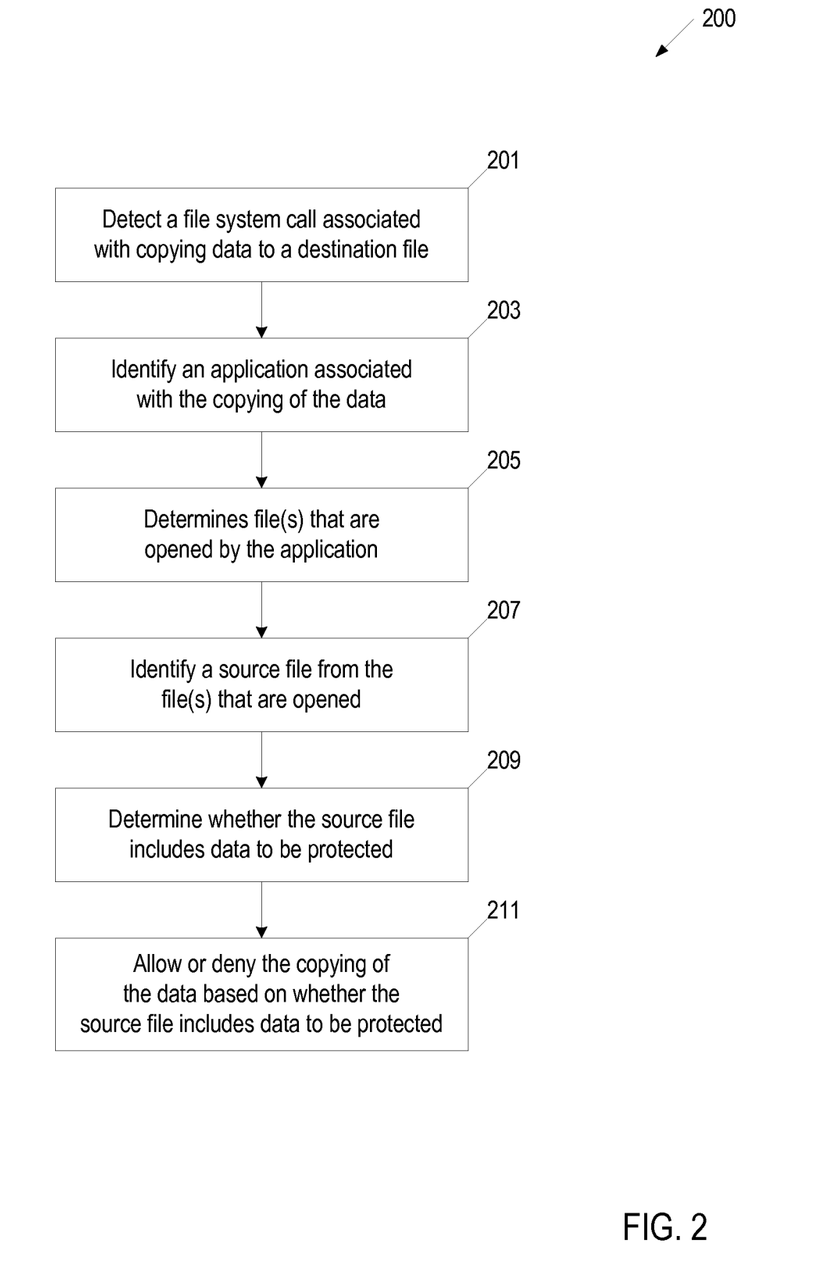
FIG. 2 is an implementation of flow diagram for providing data loss prevention for copying data.

FIG. 2 is a flow diagram of an implementation of a method 200 for providing DLP for copying files to unauthorized media. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a data loss prevention agent (e.g., data loss prevention agent 150 in FIG. 1). Portions of method 200 can be performed by a file call module 152 and/or a policy module 154 of the data loss prevention agent 150 of FIG. 1.

At block 201, the data loss prevention agent detects a file system call that is associated with copying data to a destination file. The data loss prevention agent can monitor the file system driver and intercept file system calls that are used to copy data. The data loss prevention agent monitors the file system driver to detect file system calls that the file system driver receives from an application performing a copy operation. File system calls that are associated with copying data can trigger the data loss prevention agent to enforce a DLP policy.

The file system call can be a file system call that creates a destination file and/or a file system call that writes data to the destination file. For example, the file system call may be a file create system call. For example, a user may copy a file from a computing device to a removable storage device (e.g., USB flash drive). The copy operation can include one or more file system calls, such as, a file open call (e.g., opening a file to be copied, known as a source file), a file read system call (e.g. reading data from the source file), a file create system call (e.g., creating a new file known as a destination file), and/or a file write system call (e.g. writing the data from the source file to the destination file). For example, a user may use an application, such as Windows® Explorer, to perform a drag-and-drop operation (e.g. a copy operation) by dragging a source file (e.g., photo) named photo.jpg from a local storage (e.g., an internal hard drive) to the removable storage (e.g., a USB flash drive) to copy the source file (e.g., photo.jpg) to the removable storage.

For a copy operation, the application can send a file open system call to the file system driver to open the photo.jpg, and the file system driver can instruct the appropriate file system (e.g., file system 108) to open the file. The data loss prevention agent can monitor the file system driver for file system create calls and file system write calls being sent to the file system driver.

At block 203, the data loss prevention agent identifies an application that is associated with the copying of the data. The application is the application that initiated the copying of the data, for example, by sending a file system request to the file system driver 106. The data loss prevention agent can identify the application from the intercepted file system call. The file system call (e.g., file system create call, file system write call) can include an application identifier of the application that is associated with the file system call.

At block 205, the data loss prevention agent determines one or more files that are opened by the application. The data loss prevention agent can access a file descriptor table for the application. The file descriptor table includes a list of the files that are opened by the application.

At block 207, the data loss prevention agent identifies which one of the one or more files that are opened by the application is the source file that corresponds to the destination file. The data loss prevention agent can use metadata for each of the opened files and metadata for the destination file to determine which one of the opened files is the source file. The identifying of the source file is described in greater detail below in conjunction with FIG. 3.

At block 209, the data loss prevention agent determines whether the source file includes data to be protected and, at block 211, allows or denies the copying of the data based on whether the source file contains data to be protected. In one implementation, the policy module of the data loss prevention agent scans the source file for keywords, patterns, etc. to determine whether or not the source file contains sensitive data and/or confidential data. In one implementation, the data loss prevention agent intercepts file system calls such that the file system driver does not receive the file system calls. For example, the data loss prevention agent may intercept a file write system call being sent from an application to the file system driver requesting that data from the source file be written to the destination file.

Figure 3:
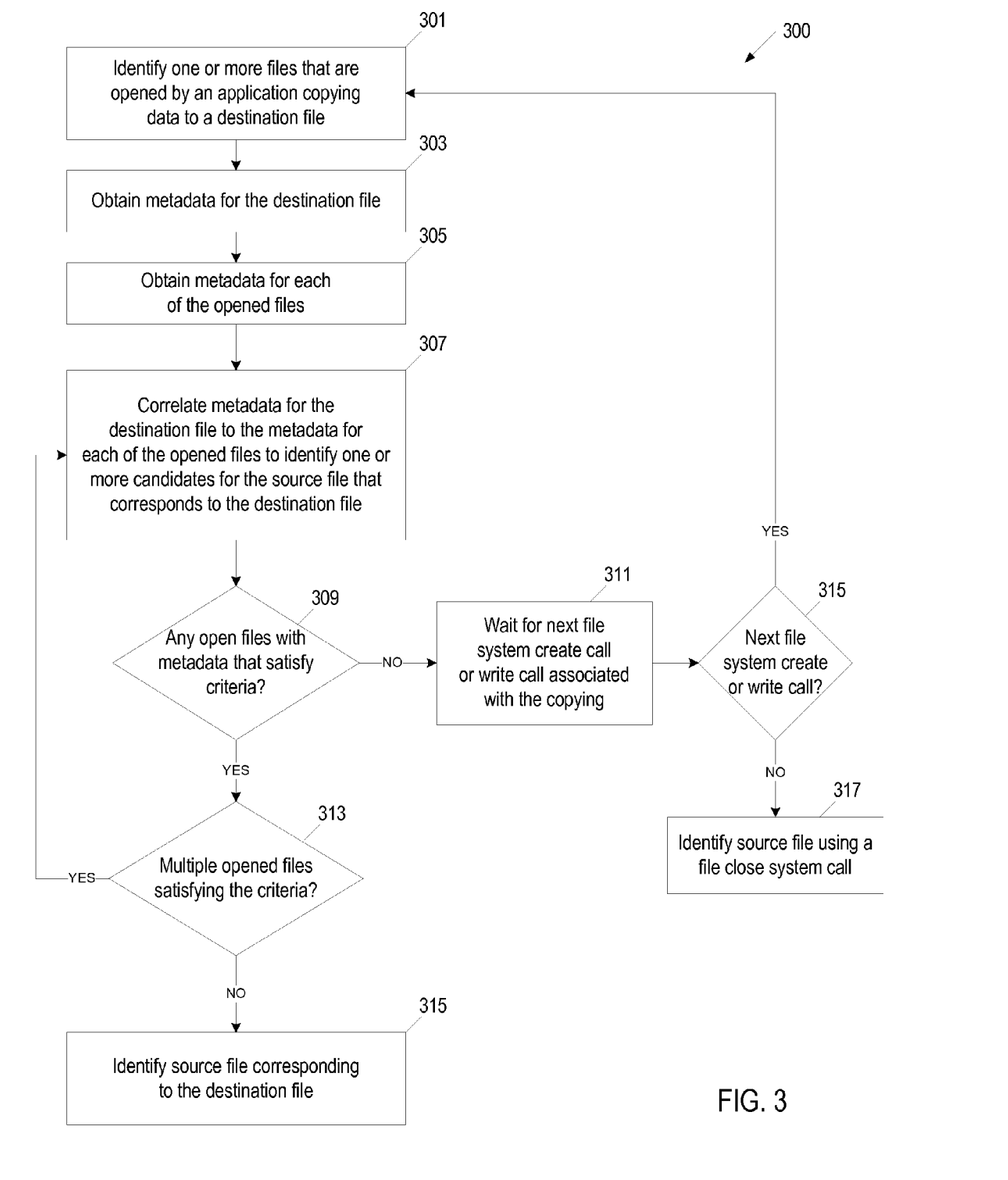
FIG. 3 is a flow diagram of an implementation of a method to identify a source file that corresponds to destination file from one or more files opened by an application.

FIG. 3 is a flow diagram of an implementation of a method 300 of identifying a source file that corresponds to destination file from one or more files opened by an application. Method 300 can be performed by processing logic that can comprise hardware (e.g., circuitry, dedicated logic, programmable logic, microcode, etc.), software (e.g., instructions run on a processing device), or a combination thereof. In one implementation, method 300 may be performed by a file call module 152 and/or a policy module 154 of the data loss prevention agent 150 of FIG. 1. FIG. 3 describes block 207 in FIG. 2 in more detail.

At block 301, the data loss prevention agent identifies one or more files that are opened by an application that is copying data to a destination file. At block 303, the data loss prevention agent obtains metadata for the destination file. The metadata for the destination file can be stored in the corresponding file system. For example, the file system can include destination file metadata, such as, and not limited to a file name, a file type, a file size, a last accessed time, and a file creation time. For example, the destination file has a file name "creditcardnumbers.doc".

At block 305, the data loss prevention agent obtains metadata for each file that is opened by the application performing the copy operation. The opened files can each have metadata, such as, and not limited to a file name, a file type, a file size, a last accessed time, and a file creation time. The metadata for each opened file can be located in the file system. For example, the application Finder® may have three files that are open, such as, File-A, File-B, and File-C. Each of the opened files can have metadata that includes, for example, a last accessed time, a file size, a file type, and a save time. For example, File-A was last accessed at Time-X, File-B was last accessed at Time-Y, and File-C was last accessed at Time-Z. In another example, File-A has a text file type, File-B has an image file type, and File-C has a text file time. In another example, File-A has a file name "creditcard.doc", File-B has a file name "vacation.jpg", and File-C has a file name "creditscores.doc".

At block 307, the data loss prevention agent correlates the metadata from the destination file with the metadata each of the one or more files that are opened to reduce the number of opened files which may be the source file that corresponds to the destination file. The data loss prevention agent can correlate metadata to identify which of the open files are candidates for being the source file that corresponds to the destination file. For example, the data loss prevention agent can compare the file name of the destination file to the file name of each of the opened files to determine which of the opened files have a file name that is similar to the file name of the destination file.

For example, the data loss prevention agent can determine which of the opened files has a file name that is the closest matching to the file name of the destination file. For example, the data loss prevention agent may determine that out of the three opened files (e.g., File-A, File-B, and File-C), the file name for File-A, which is "creditcard.doc", and the file name for File-C, which is "creditscores.doc" are the closest matches to the file name of the destination file, which is "creditcardnumbers.doc". The data loss prevention agent can access criteria that are stored, for example, as configuration data in a data store, to determine how to correlate the metadata and how to select one or more of the opened files as candidates for being the source file. For example, the criteria may indicate a pattern that the data loss prevention agent should recognize in the file name metadata. In another example, the criteria can indicate a candidate open file should have a last accessed timestamp that is within a value (e.g., a few nanoseconds) from a creation timestamp for the destination file. The timestamp can represent, for example, a file creation time, a last accessed time, or a save time. The criteria can be configurable and user defined.

At block 309, the data loss prevention agent determines whether there are any opened files that have metadata that satisfies the criteria. There may not be a file that is open that meets the criteria. For example, there may not be a file that is open that has a file name that satisfies the criteria of being similar to the file name of the destination file. For example, the destination file may be created, but the source file that corresponds to the destination may not yet be open. In another example, a user has intentionally created the file name of the destination file to be dissimilar to the file name of source file that corresponds to destination file.

If there are no open files that satisfy the criteria (block 309), the data loss prevention agent waits for a next file system call (e.g., a file system write call) that is associated with copying the data to the destination file at block 311. A copy operation can involve multiple file systems calls. For example, for a copy operation, the application can send a file open system call to the file system driver to open a file, and the file system driver can instruct the appropriate file system (e.g., file system 108) to open the file. The application can then send a file create system call to the file system driver, and the file system driver can instruct the appropriate file system (e.g., file system 172) to create a destination file on a USB flash drive. The data loss prevention agent can detect the file create system call made by the application to the file system driver.

If there is a file system create call or file system write call that is associated with copying of the data to the destination file at block 315, the data loss prevention agent 150 identifies one or more files that are currently opened by the application at block 301. If there is not a file system create call or file system write call that is associated with copying of the data to the destination file at block 315, the data loss prevention agent 150 identifies the source file using a file close system call and correlating metadata 116, such as file size, or random sampling of metadata, or both at block 317.

If there is one or more opened files that have metadata that satisfies the criteria (block 309), the data loss prevention agent determines whether there are multiple opened files that satisfy the criteria at block 313. If there is a single opened file that satisfies the criteria, the data loss prevention agent identifies the single opened file as the source file that corresponds to the destination file at block 315.

If there are multiple opened files that satisfy the criteria (block 313), the data loss prevention agent 150 returns to block 307 to further correlate metadata of the destination file to the metadata for the opened files to further reduce the number of opened files that satisfy the criteria. For example, a user may save a file onto an unauthorized destination (e.g. removable storage 170) using the "Save As" feature of an application (e.g. Microsoft® Word), and the source file can be identified using metadata 116 of the last access time and the file type at block 307.

Figure 4:
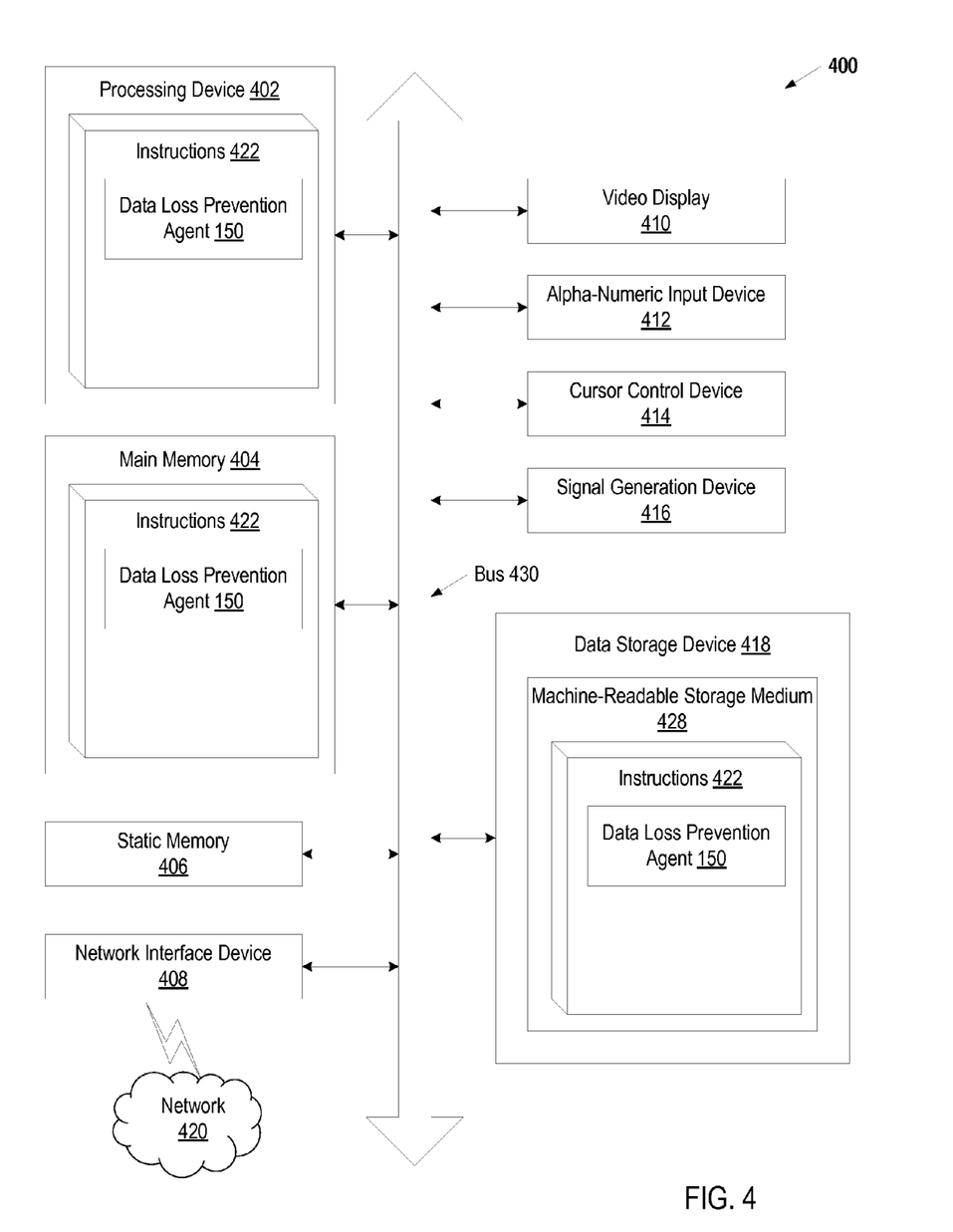
FIG. 4 is a block diagram of an example computer system that may perform one or more of the operations described herein.

FIG. 4 illustrates a machine in an example form of a computing system 400 within which a set of instructions, for causing the machine to perform any one or more of the methodologies discussed herein, may be executed. The computing system 400 can be computing device 101 in FIG. 1. In alternative embodiments, the machine may be connected (e.g., networked) to other machines in a LAN, an intranet, an extranet, or the Internet. The machine may operate in the capacity of a server or a client machine in the client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 100 includes a processing device (processor) 402, a main memory 404 (e.g. read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic for instructions 422 for performing the operations and steps discussed herein.

The computing system 400 may further include a network interface device 408. The computing system 400 also may include a video display unit 410 (e.g. liquid crystal display (LCD) or a cathode ray tube (CRT), an alphanumeric input device 412 (e.g., a keyboard), a cursor control device 414 (e.g., a mouse), and a signal generation device 416 (e.g., a speaker).

The data storage device 418 may include a machine-readable storage medium 428 (also known as a computer-readable medium) on which is stored one or more sets of instructions 422 embodying any one or more of the methodologies or functions described herein. The instructions 422 may also reside, completely, or at least partially within the main memory 404 and/or within the processing device 402 during execution thereof by the computing system 400, the main memory 404, and the processing device 402 also constituting computer-readable media. The instructions may further be transmitted or received over a network 420 via the network interface device 408.

In one implementation, the instructions 422 include instructions for a data loss prevention agent (e.g., data loss prevention agent 150 in FIG. 1) and/or a software library containing methods that calls modules in a data loss prevention agent. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting" or "identifying" or "determining" or "allowing" or "denying" or "correlating" or "accessing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Implementations of the present invention also relate to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, and not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   detecting, by a processing device, a file system call, wherein the file system call is associated with copying data to a destination file;
   identifying an application initiating the copying of the data to the destination file;
   determining one or more files that are opened by the application;
   identifying a source file from the one or more files opened by the application, wherein the source file is identified based upon selection criteria associated with the destination file;
   determining whether the source file includes data to be protected; and
   allowing or denying the copying of the data to the destination file based on whether the source file includes data to be protected.

2. The method of claim 1, wherein the file system call is one of a file create system call or a file write system call.

3. The method of claim 1, wherein the destination file resides on at least one of a removable media, a network location, a local media, or a temporary media.

4. The method of claim 1, wherein identifying the source file comprises:
   determining if a destination file name for the destination file matches a file name of one of the one or more files that are opened by the application.

5. The method of claim 1, wherein identifying the source file comprises:
   correlating metadata for the one or more files opened by the application with metadata for the destination file.

6. The method of claim 5, wherein the metadata for the one or more files opened by the application and the metadata for the destination file comprises at least one of a file name, a last accessed time, a file creation time, a file type, or a file size.

7. The method of claim 1, wherein determining the one or more files opened by the application comprises:
   accessing a list of one or more open files in a file descriptor table for the application.

8. The method of claim 1, wherein identifying the source file from the one or more files opened by the application comprises:
   detecting a subsequent file system call that is associated with the copying of the data to the destination file.

9. A system comprising:
   a memory; and
   a processing device coupled with the memory to:
   detect a file system call, wherein the file system call is associated with copying data to a destination file;
   identify an application initiating the copying of the data to the destination file;
   determine one or more files that are opened by the application;
   identify a source file from the one or more files opened by the application, wherein the source file is identified based upon selection criteria associated with the destination file;
   determine whether the source file includes data to be protected; and
   allow or deny the copying of the data to the destination file based on whether the source file includes data to be protected.

10. The system of claim 9, wherein the file system call is one of a file create system call or a file write system call.

11. The system of claim 9, wherein the destination file resides on at least one of a removable media, a network location, a local media, or a temporary media.

12. The system of claim 9, wherein to identify the source file comprises:
   determining if a destination file name for the destination file matches a file name of one of the one or more files that are opened by the application.

13. The system of claim 9, wherein to identify the source file comprises:

correlating metadata for the one or more files opened by the application with metadata for the destination file.

14. The system of claim 13, wherein the metadata for the one or more files opened by the application and the metadata for the destination file comprises at least one of a timestamp, a last accessed time, a file type, or a file size.

15. The system of claim 9, wherein determining the one or more files opened by the application comprises:
   accessing a list of one or more open files in a file descriptor table of the application.

16. A non-transitory computer readable storage medium including instructions that, when executed by a processing device, cause the processing device to perform operations comprising:
   detecting, by the processing device, a file system call, wherein the file system call is associated with copying data to a destination file;
   identifying an application initiating the copying of the data to the destination file;
   determining one or more files that are opened by the application;
   identifying a source file from the one or more files opened by the application, wherein the source file is identified based upon selection criteria associated with the destination file;
   determining whether the source file includes data to be protected; and
   allowing or denying the copying of the data to the destination file based on whether the source file includes data to be protected.

17. The non-transitory computer readable storage medium of claim 16, wherein the file system call is one of a file create system call or a file write system cal.

18. The non-transitory computer readable storage medium of claim 16, wherein the destination file resides on at least one of a removable media, a network location, a local media, or a temporary media.

19. The non-transitory computer readable storage medium of claim 16, wherein identifying the source file comprises:
   determining if a destination file name for the destination file matches a file name of one of the one or more files that are opened by the application.

20. The non-transitory computer readable storage medium of claim 16, wherein identifying the source file comprises:
   correlating metadata for the one or more files opened by the application with metadata for the destination file.

* * * * *